United States Patent

Kozyreff et al.

[11] Patent Number: 5,924,725
[45] Date of Patent: Jul. 20, 1999

[54] STEERING WHEEL WITH A PREASSEMBLED AIR-BAG ANTI-IMPACT DEVICE

[75] Inventors: Michel Kozyreff, Bonsecours, France; Bernd Werner, Schliersee, Germany; Josef Egger, Ergoldsbach, Germany; Sonja Kuchler, Hechendorf, Germany

[73] Assignee: Autoliv Development AB, Vargarda, Sweden

[21] Appl. No.: 08/716,204

[22] PCT Filed: Mar. 3, 1995

[86] PCT No.: PCT/SE95/00221

§ 371 Date: Oct. 30, 1996

§ 102(e) Date: Oct. 30, 1996

[87] PCT Pub. No.: WO95/23712

PCT Pub. Date: Sep. 8, 1995

[30] Foreign Application Priority Data

Mar. 3, 1994 [GB] United Kingdom .................. 9404116
Nov. 30, 1994 [DE] Germany .......................... 44 42 585

[51] Int. Cl.[6] .................................................. B60R 21/16
[52] U.S. Cl. .................... 280/731; 280/731; 280/728.3; 280/728.1
[58] Field of Search ............................ 280/731, 728.3, 280/728.1

[56] References Cited

U.S. PATENT DOCUMENTS 5,297,813  3/1994  Baba et al. ........................ 280/728.3
5,470,099  11/1995  Williams .............................. 280/728.2

FOREIGN PATENT DOCUMENTS

| 0367415 | 5/1990 | European Pat. Off. . |
| 0488618 | 6/1992 | European Pat. Off. . |
| 0539869 | 5/1993 | European Pat. Off. . |
| 0582335 | 2/1994 | European Pat. Off. . |
| 2242871 | 10/1991 | United Kingdom . |
| 9509745 | 4/1995 | WIPO . |
| 9510440 | 4/1995 | WIPO . |

*Primary Examiner*—Eric D. Culbreth
*Attorney, Agent, or Firm*—Robert W. Becker & Associates

[57] ABSTRACT

A steering wheel unit for mounting on a steering column of a motor vehicle has a steering wheel including an inner frame with a steering wheel rim and with at least one spoke connected to the steering wheel rim and extending radially inwardly toward a steering column. The steering wheel includes a molded plastic envelope enclosing the inner frame. An air-bag anti-impact device is mounted on the steering wheel. A cap for covering the air-bag anti-impact device is provided. The air-bag anti-impact device has a folded air-bag and a gas producer for inflating the air-bag when tripped. The air-bag has a delimiting edge and is connected with the delimiting edge to the steering wheel to thereby delimit a gas inlet opening for gas produced by the gas producer upon tripping. The cap is opened by the force of the air-bag when being inflated by the gas producer. The molded plastic envelope and the cap are integrally formed so as to define a receiving area for the air-bag anti-impact device, wherein the air-bag anti-impact device is mounted within the receiving area.

19 Claims, 2 Drawing Sheets

STEERING WHEEL WITH A PREASSEMBLED AIR-BAG ANTI-IMPACT DEVICE

BACKGROUND OF THE INVENTION

The invention relates to a steering wheel for motor vehicles, which is to be fastened to a steering column, having an inner frame formed by a steering wheel rim and by at least one spoke directed radially relative to the steering column, the frame being enveloped by a moulded part made of a suitable plastic material, and having an air-bag anti-impact device integrated into the steering wheel and covered by means of a cap, said device comprising a folded air bag which is inflatable by means of a trippable gas producer and is fastened to the steering wheel by its edge delimiting the gas inlet opening associated with the gas producer, the cap being opened by the inflating air bag.

A steering wheel of said type is described in EP 0 582 335 A1; from the structure of the known steering wheel it emerges that, during final assembly of the motor vehicle, the air-bag anti-impact device is installed from the direction of the driver's seat into the open steering wheel already mounted on the steering column and then the assembly opening is closed by means of a cap which is fastenable to the steering wheel by separate fastening means, the cap in turn having a predetermined breaking point for releasing the inflating air bag when it is tripped.

The drawback of a steering wheel constructed in said manner is that the moulded part, which envelops the frame of the steering wheel, and the cap for the air bag have to be manufactured as two separate plastic parts and then be joined together; the inevitable result is either a visible predetermined breaking line or a gap circumscribing the air bag module, which gap as a rule because of the cumulative tolerances of the separate parts during manufacture and assembly is seldom of a uniform width and is therefore visually unattractive. Furthermore, assembly of the air-bag anti-impact device into the open pot of the steering wheel is an elaborate process and it is impossible to rule out faults which, in the motor vehicle, are no longer detectable or are detectable only by a great deal of work on the completely assembled steering wheel.

The object of the invention is therefore to provide a steering wheel having the initially described features, which has a more pleasing appearance and in which it is easier to assemble the air-bag anti-impact device.

SUMMARY OF THE INVENTION

The manner in which said object is achieved, including advantageous refinements and developments of the invention, is evident from the content of the claims which follow the present description.

The steering wheel unit for mounting on a steering column of a motor vehicle according to the present invention is primarily characterized by:

a steering wheel including an inner frame with a steering wheel rim and with at least one spoke connected to the steering wheel rim and extending radially inwardly toward a steering column and including a molded plastic envelope enclosing the inner frame;

an air-bag anti-impact device mounted on the steering wheel;

a cap for covering the air-bag anti-impact device;

the air-bag anti-impact device comprising a folded air-bag and a gas producer for inflating the air-bag when tripped;

the air-bag having a delimiting edge and being connected with the delimiting edge to the steering wheel to thereby delimit a gas inlet opening for gas produced by the gas producer upon tripping;

the cap being opened by the force of the air-bag when being inflated by the gas producer;

the molded plastic envelope and the cap being integrally formed so as to define a receiving area for the air-bag anti-impact device, wherein the air-bag anti-impact device is mounted within the receiving area.

The steering wheel is comprised of a top part and a bottom part, and the top part and the bottom part together form the receiving area, wherein the air-bag is positioned in the top part, and the gas producer is positioned in the bottom part.

Advantageously, the delimiting edge of the air-bag is fastened to the top part and, subsequently, the air-bag is placed into the top part.

The delimiting edge is expediently clamped between the top part and the bottom part.

In another embodiment of the present invention, the delimiting edge and the gas producer are fastened jointly to the bottom part. The steering wheel unit further comprises a cover comprising a cup with a circumferential flange. The cup encloses the air-bag and extends upwardly into the top part. The circumferential flange of the cover is clamped between the top part and the bottom part.

The steering wheel unit further comprises a housing, wherein the air-bag anti-impact device is mounted in the housing and wherein the housing with the air-bag anti-impact device is mounted in the receiving area.

The steering wheel unit further comprises a snap connection for securing the housing to the steering wheel.

The snap connection comprises cooperating snap elements connected to the housing and to the molded plastic envelope.

The housing is pot-shaped and upwardly open and has a radially projecting circumferential outer flange for fastening the housing to the steering wheel.

The housing comprises at least one screw connection penetrating the outer flange for attaching the housing to the steering wheel.

The inner frame expediently has a ring embracing the housing, the ring comprising fasteners for connecting the housing and the ring to one another.

The steering wheel unit further comprises fasteners for mounting the housing to the steering wheel and comprising a mounting frame for connecting the steering wheel unit to the steering column, wherein the fasteners are simultaneously used to attach the steering wheel to the mounting frame.

The air-bag anti-impact device comprises a tripping device for tripping the gas producer and an acceleration sensor connected to the tripping device and mounted on the mounting frame.

The steering wheel unit further comprises a housing, wherein the air-bag anti-impact device is mounted in the housing and the housing is connected between the steering wheel and the steering column.

The housing comprises, a sleeve for mounting the housing to the steering column and further comprises radially engaging fasteners for attaching the sleeve to the steering column.

The housing is pot-shaped and upwardly open and has a radially projecting circumferential outer flange for fastening the housing to the steering wheel, wherein the housing comprises at least one screw connection for attaching the outer flange to the steering wheel.

In yet another embodiment of the present invention, the steering wheel comprises an inner frame comprising a steering wheel rim and at least one spoke connected to the steering wheel rim and extending radially inwardly. A molded plastic envelope enclose the inner frame. The molded plastic, envelope comprises a center portion extending across a central part of the steering wheel, the center portion having a recess for receiving an air-bag unit.

The recess has an inwardly extending projection forming a first part of a snap connection.

The steering wheel unit further comprises an air-bag unit, the air-bag unit connected to the steering wheel.

The air-bag unit comprises a housing mounted in the recess, the housing having a projection forming a second part of the snap connection, wherein the first and the second parts of the snap connection engage one another to secure the housing in the recess.

The air-bag unit has a radially outwardly extending flange with apertures and further includes fasteners, wherein the fasteners pass through the apertures to secure the air-bag unit with the flange to the inner frame.

The fasteners comprise studs supported by the inner frame and nuts engaging the studs.

The steering wheel unit further comprises a mounting frame for attaching to a steering column of a vehicle, wherein the fasteners connect the steering wheel together with the air-bag unit to the mounting frame.

The steering wheel unit further comprises a crash sensor, for triggering the air-bag unit, directly mounted on the mounting frame, wherein the mounting frame is substantially rigidly connected to the steering column.

The mounting frame is connected to the steering column after the steering wheel and the air-bag unit have been assembled.

The air-bag unit comprises a housing with a substantially cylindrical wall and the inner frame comprises a ring, wherein the cylindrical wall of the housing abuts the ring. The steering wheel unit further comprises at least one fastener for connecting the cylindrical wall to the ring.

The ring has at least one aperture and the cylindrical wall has at least one aperture, the at least one aperture of the ring being aligned with the at least one aperture of the cylindrical wall and the at least one fastener extending through the aligned apertures.

The steering wheel unit further comprises a mounting frame connected to a steering column of a vehicle, wherein the at least one fastener connects the steering wheel together with the air-bag unit to the mounting frame.

The steering wheel unit further comprises a crash sensor, for triggering the air-bag unit, directly mounted on the mounting frame, wherein the mounting frame is substantially rigidly connected to the steering column.

The mounting frame is connected to the steering column after the steering wheel and the air-bag unit have been assembled.

The air-bag unit comprises a tubular housing received in the steering wheel.

As its basic idea, the invention proposes that the moulded part, which envelops the frame of the steering wheel, is integrally formed with the cap and jointly with the cap forms a receiving area for the air-bag anti-impact device, and that the steering wheel with the air-bag anti-impact device installed in the receiving area is mountable onto the steering column and connectable thereto. The invention offers the advantage that the air-bag anti-impact device may be installed, as it were, "from behind" into the steering wheel so that the steering wheel preassembled with the air-bag anti-impact device may then be fastened as a unit on the steering column during assembly of the motor vehicle.

Because the moulded part surrounding the frame of the steering wheel is integrally formed with the cap, there are no obtrusive gaps or predetermined breaking lines, with the result that the visual appearance is improved.

According to an embodiment of the invention, the steering wheel is of a two-piece construction having a top part and a bottom part which together form the receiving area, the air bag being inserted into the portion of the receiving area formed by the top part and the gas producer being inserted into the portion of the receiving area formed by the bottom part. Said construction advantageously allows the air bag to be packed into the receiving area of the top part and the edge of the air bag delimiting the gas inlet opening to be fixed in advance to the top part, thereby simplifying assembly.

Particularly when the edge of the air bag delimiting the gas inlet opening is clamped, and hence fastened, between the top part and the bottom part, the particular advantage arises that the clamping forces for fixing the air bag on the steering wheel part are reduced in terms of surface area since there is a comparatively large fastening surface available between the top part and the bottom part. This simultaneously simplifies assembly of the air bag in the top part of the steering wheel and prevents unintentional nipping of the air bag during assembly. Finally, the manufacturing costs of the air bag are reduced, because less air bag material is needed, and a special construction of fastening holes in the bag mouth is avoided since the material load resulting from the inflation process is distributed over a large area.

According to another embodiment of the invention, the edge of the air bag is fastened jointly with the gas producer in the bottom part. A cover which frames the folded air bag and lies in the top part is clamped by means of an outer circumferential flange between the top part and the bottom part. By said means also, assembly is made much simpler.

According to further embodiments of the invention it is provided that the air-bag anti-impact device is disposed in a separate housing and said housing is inserted into the receiving area and fastened to the steering wheel; said fastening of the housing to the steering wheel may be effected either by means of a snap connection or by means of screw connections; in such cases, according to embodiments of the invention it is provided that the steering column has an mounting frame for fastening the steering wheel on the steering column, the fastening means which are used to fasten the moulded part or the frame of the steering wheel and the housing of the air-bag anti-impact device to one another simultaneously being used to fasten the steering wheel to the mounting frame so that, by said means also, the assembly effort is reduced and the assembled effect improved.

Finally, according to an embodiment of the invention it is also proposed to fasten the housing of the air-bag anti-impact device itself to the steering column of the motor vehicle and then to fasten the steering wheel in turn to the housing of the air-bag anti-impact device.

BRIEF DESCRIPTION OF THE DRAWINGS

There follows a description of embodiments of the invention, which are illustrated in the drawings. The drawings show.

DESCRIPTION OF PREFERRED EMBODIMENTS

Figure 1B:
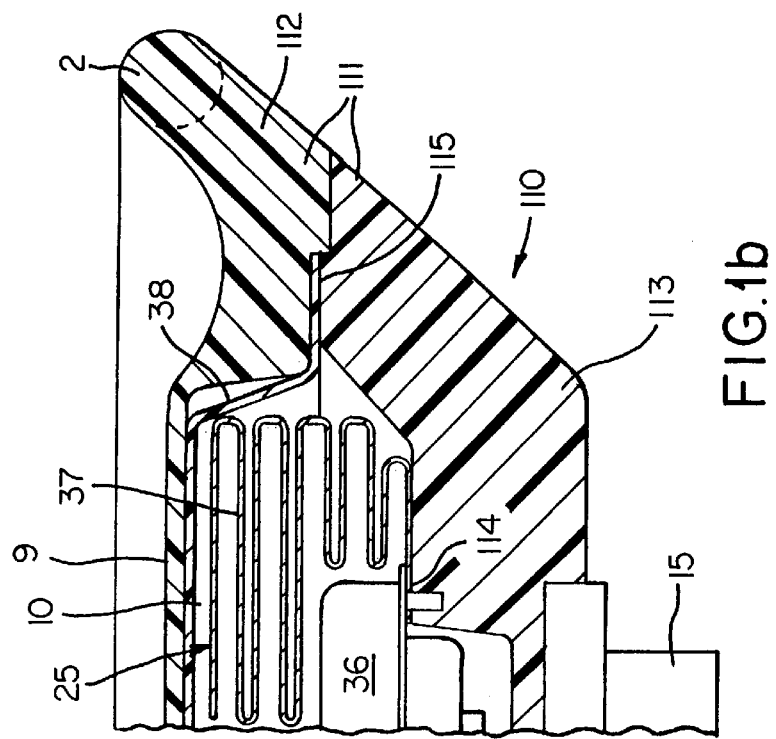
FIGS. 1a and 1b in each case a sectional view of a steering wheel in which an air-bag protection device is installed, FIGS. 2–4 further embodiments of the subject of FIGS. 1a, 1b, in each case in section.
Figure 1A:
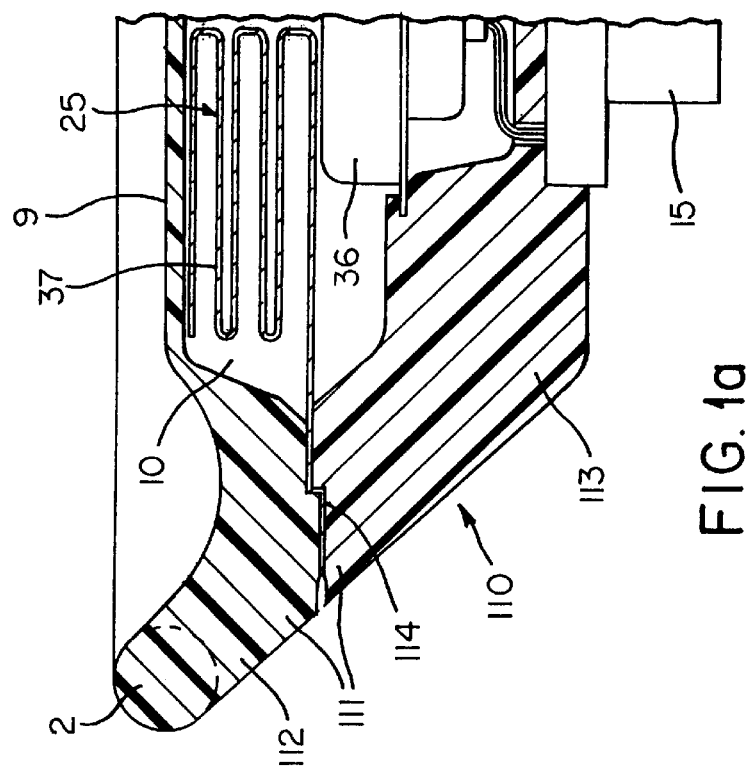

FIGS. 1a, 1b illustrate, first of all, two embodiments of the invention which differ only slightly from one another. In the illustrated embodiments, a steering wheel 110 comprises a moulded part Ill made of a suitable plastic material and consisting of a top part 112 and a bottom part 113; the bottom part 113 in particular may however alternatively be made of other materials and have other functions. An outer steering wheel rim 2 is integrated, as part of a metal frame forming the steering wheel structure, (inner frame) into the top part 112. Top part 112 and bottom part 113 together form a receiving area 10 for an air-bag anti-impact device 25 comprising an air bag 37 and a gas producer 36. Whereas the bottom part 113 of the steering wheel 110 is fastenable on a steering column 15 of a motor vehicle in a manner yet to be explained, the top part 112 of the steering wheel integrally forms a cap 9 which covers the receiving area 10; the cap 9 is provided with a predetermined breaking point, which is not shown in FIGS. 1a, 1b, to enable the cap to burst open upon tripping of the air-bag anti-impact device and simultaneous inflation of the air bag 37.

In the embodiment shown in FIG. 1a, the gas producer 36 is disposed and suitably fastened in the portion of the receiving area 10 situated in the bottom part 113 of the moulded part 111; the air bag 37 is folded in the portion of the receiving area 10 situated in the top part 112 and is clamped here, by its edge 114 delimiting the gas inlet opening, between the top part 112 and the bottom part 113 with the result that the air bag 37 is easily and securely fastened to the steering wheel 110.

In the embodiment shown in FIG. 1b, the gas producer 36 is similarly disposed and fastened in the portion of the receiving area 10 situated in the bottom part 113, the fastening of the edge 114 of the air bag 37 being integrated into the fastening of the gas producer 36 in the bottom part 113 in such a way that the edge 114 of the air bag 37 is clamped between the gas producer 36 and the bottom part 113. The folded air bag 37 extends into the portion of the receiving area 10 situated in the top part 112 and is additionally fixed by means of a cover 38 which extends into the top part 112; the cover 38 is clamped and hence fastened by means of a radially projecting, circumferential flange 115 between the top part 112 and the bottom part 113.

Figure 2:
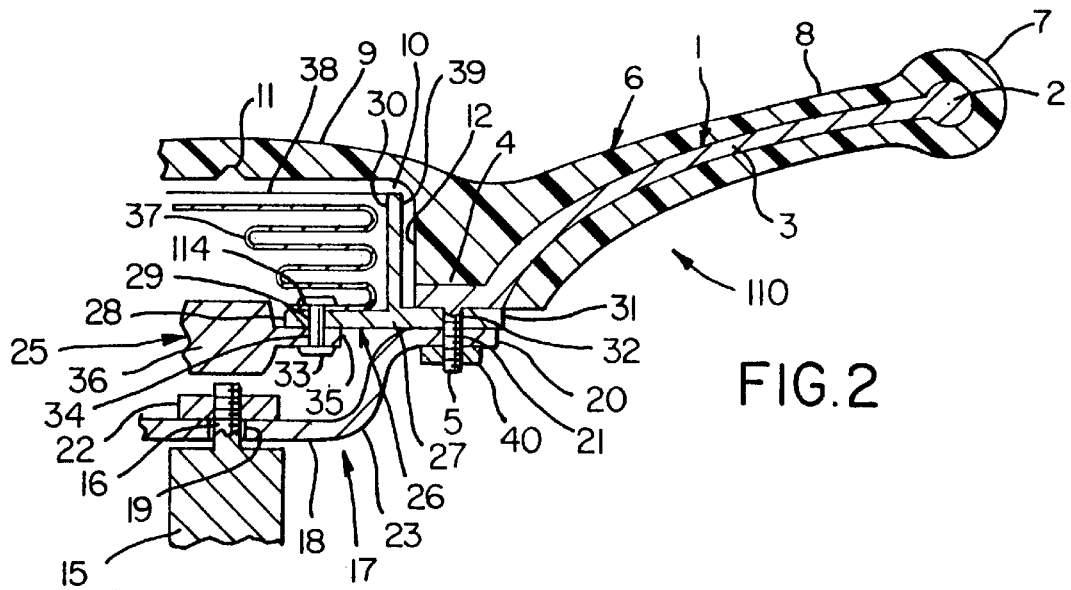
Figure 3:
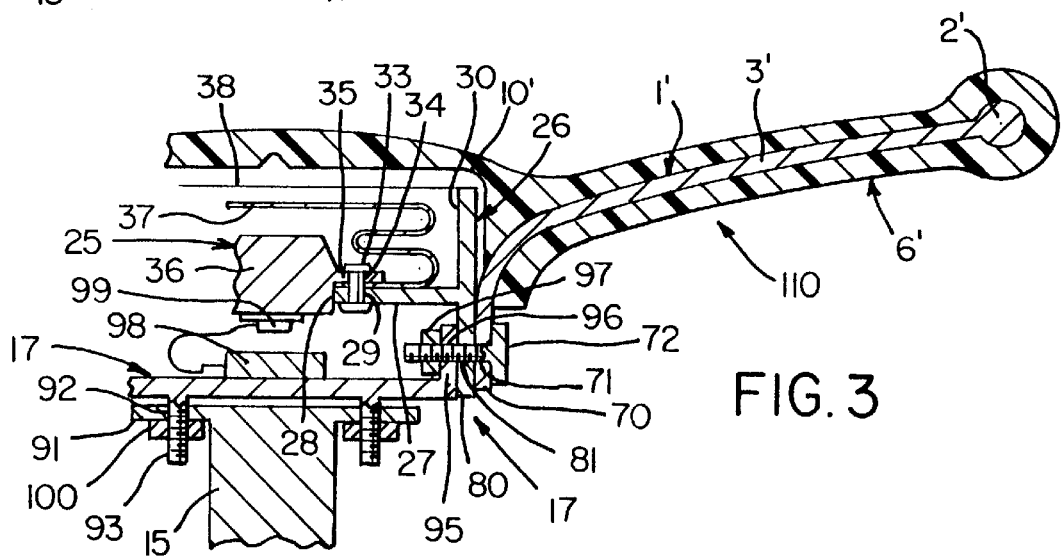
Figure 4:
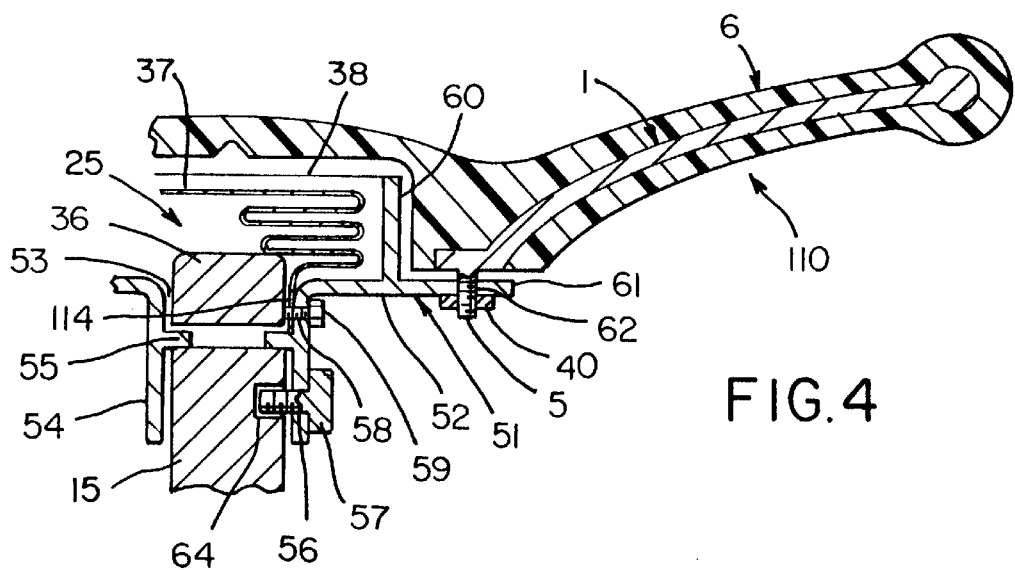

In the embodiments shown in FIGS. 2 to 4, the steering wheel 110 is of a different construction; it comprises a metal frame 1 having an outer peripheral ring 2, which is intended to define the middle portion of the rim of the steering wheel, and having a plurality of substantially radially extending spokes 3 which in FIG. 2, a description of which first follows, terminate at their inner ends with an inner ring 4; a plurality of threaded pins 5 project at intervals down from the ring 4.

The inner frame 1 is enveloped by a plastic moulded part (molded plastic envelope) 6, a part 7 of the moulded part 6, which surrounds the metal ring 2, forming the outer rim of the steering wheel; the moulded part 6 further has a part 8, which covers the radial spoke 3, and finally the moulded part 6 comprises an integrally formed cap 9, which extends substantially across the central hole defined by the ring 4 of the frame. Situated below the cap 9 and inside the ring 4 is a receiving area 10 in the form of a recess. The underside of the cap 9 is provided with a notch 11, which forms a predetermined breaking point enabling the cap 9 to burst open upon tripping of the air-bag anti-impact device. The wall of the receiving area 10 is further provided with an inward-directed projection 12.

The above-described steering wheel 110 with the moulded part 6 integrated thereon may easily be produced by first manufacturing the metal inner frame 1 and then employing conventional pressing techniques in order to add the moulded part 6. Said steering wheel is constructed in such a manner that it may, together with an air-bag anti-impact device preassembled in the receiving area 10, be mounted on a steering column 15. As is evident particularly from FIG. 2, a steering column 15 of a motor vehicle has at its, top end an upward-directed, threaded attachment 16. A mounting frame 17 is further provided, which comprises a central ring 18 defining a hole 19, by means of which the mounting frame 17 is placed on the attachment 16 of the steering column 15; a nut 22 is screwed onto the threaded attachment 16 in order to fix the mounting frame 17 in position. The mounting frame 17 further has radially extending arms 23 which terminate in an outer ring 20, whose external diameter corresponds to the external diameter of the ring 4. Formed in the ring 20 is a plurality of holes 21, which are arranged in such a way that they may be aligned with the downward-projecting threaded pins 5 carried by the ring 4.

An air-bag anti-impact device 25 is provided, comprising a pot-shaped housing 26 with a horizontal base 27, in which is defined a central hole 28 around which small holes 29 are disposed. The housing 26 has an upright, circular outer wall 30, the base 27 continuing into a flange 31 which projects radially out beyond the outer wall 30 and the flange 31 containing holes 32 arranged in such a way that they may be aligned with the threaded pins 5 provided on, and projecting down from the ring 4 of the frame 1.

Mounted in the central hole 28 of the housing 26 is a gas producer 36 which has a flange 35 provided with a ring of holes 34, the fastening of the gas producer 36 being effected in that bolts or rivets 33 penetrate the holes 29 in the base 27 of the housing 26 and the holes 34 in the gas producer flange 35; said bolts or rivets 33 are simultaneously used to fasten the edge 114 of the air bag 37 to the top surface of the base 27 of the housing 26. A cover 38 which acts as a transport cover overlaps the air bag 37, the cover 38 being connected to the top portion of the upright outer wall 30. On the outside of the wall 30, a projection 39 is provided as a detent projection.

The housing 26 with the upright outer wall 30 is so dimensioned that the housing 26 may be inserted into the receiving area 10 defined by the moulded part 6; the projection 39 is aligned in such a way as to form with the projection 12 of the moulded part 6 a snap connection for temporarily fixing the air-bag anti-impact device 25 in the receiving area 10. As soon as the gas producer 36 has been fixed in position, the threaded pins 5 of the frame 1 are passed through the holes provided in the flange 31 of the housing 26; the assembled combination of frame 1, 6 and air-bag anti-impact device 25 is then placed onto the mounting frame 17, the threaded pins 5 penetrating the holes 21 of the mounting frame 17, and finally nuts 40 are screwed onto the downward-projecting ends of the threaded pins 5 and tightened so that the steering wheel, with the air-bag anti-impact device preassembled therein, is fastened to the mounting frame 17.

From the above it is clear that the combination of air-bag anti-impact device and steering wheel need not be installed until the final stage of assembly of a vehicle, with the result that the air-bag anti-impact device is in the vehicle only during the last stage of its manufacture, thereby also reducing the error rate possibly arising during assembly of a vehicle.

In the embodiment of the invention shown in FIG. 3, only the fastening of the housing 26 of the air-bag anti-impact device 25 and the steering wheel 110 to the steering column 15 is of a different design, with in particular the construction of the housing 26, as such, and the mounting and fastening of the gas producer and the edge of the air bag, as well as the air bag itself remaining the same. To said extent, in the embodiment according to FIG. 3 identical parts are also provided with identical reference numerals.

In the embodiment shown in FIG. 3, the steering wheel comprises an inner frame 1', which has an outer ring 21 and at least one radially inward-directed spoke 3'; a moulded part 6' is also provided, which is substantially identical to the moulded part 6 of the embodiment described in FIG. 2. The inner ends of the spoke or spokes 3 terminate, in the embodiment according to FIG. 3, in a tubular ring 70 having at its outer periphery holes 71 for receiving in each case a threaded pin 72. The tubular ring 70 is so dimensioned that the housing 26 of the air-bag anti-impact device 25 may be inserted into the tubular ring 70, the housing 26 having an extension 80, which extends as a continuation of the outer wall 30 below the base 27 and is provided with a plurality of holes 81; the holes 81 are to be aligned with the holes 71 of the tubular ring 70 so that the threaded pins 72 may penetrate both holes 71, 81.

During assembly, first the air-bag anti-impact device 25 may be inserted into the receiving area 10' defined by the moulded part 6', the threaded pins 72 being moved inwards in order to engage into the holes 81 of the housing 26 so that subsequently the air-bag anti-impact device 25 and the rest of the steering wheel may be handled as a single unit.

For fastening the steering wheel to the steering column 15, the steering column 15 in the embodiment according to FIG. 3 terminates at its top end in a radially outward-directed flange 91 having a plurality of holes 92 for receiving, in each case, a downward-directed attachment 93 which is connected to the flat base of the mounting frame 17.

The assembly mounting 17 has an upright peripheral ring 95, which in turn has a plurality of holes 96. A nut 97 is associated with each hole 96 on the inside of the ring 95 and is fastened here to the ring. The ring 95 is so dimensioned that it is received by the wall part 80 of the housing 26, and the holes 96 in the ring 95 are arranged in such a way that they may be aligned with the threaded pins 72. For fastening the unit comprising the air-bag anti-impact device 25 and the rest of the steering wheel, the threaded pins 72 are moved radially inwards so that they penetrate the holes 96 in the ring 95 and may be screwed into the nuts 97. In so doing, the threaded pins may be raised in order to fix the steering wheel in position on the mounting frame 17.

Provided on the base of the mounting frame 17 is an acceleration sensor 98, which is connected to a tripping device 99 provided on the gas producer 36.

Once the steering wheel with the air-bag anti-impact device preassembled therein has been connected to the assembly mounting frame 17, the entire unit in the last stages of the final assembly of a motor vehicle may be fastened on the steering column 15 by inserting the attachments 93 through the holes 92 and by screwing lock nuts 100 onto the attachments 93; the mounting frame 17 is then firmly connected to the steering column 15 and the steering wheel is therefore fastened securely in position.

Since the mounting frame 17 is firmly connected to the steering column 15, and since the acceleration sensor 98 is firmly connected to the base of the mounting frame 17, an impact propagating upwards at the steering column in the event of an accident will be transmitted directly to the acceleration sensor 98, thereby enabling the acceleration sensor to operate efficiently and reliably.

Finally, in the embodiment illustrated in FIG. 4, fastening of the housing of the air-bag anti-impact device is effected on the one hand directly to the steering column, while at the same time the steering wheel is in turn fastened to the housing of the air-bag anti-impact device. In the embodiment illustrated in FIG. 4, the air-bag anti-impact device comprises a pot-shaped housing 51 which defines a base 52; a sleeve-like journal 54 projects down from the base 52 and has an inner recess 53, the journal 54 having at its end an inward-directed flange 55. In the wall of the journal 54, a hole 56 is provided at the bottom end of the journal 54 for receiving a threaded pin 57, and situated immediately below the base 52 is a further opening 58 for receiving a threaded pin 59.

The base 52 of the pot-shaped housing 51 carries an upright outer wall 60 and continues in a radially outward-directed flange 61 containing a plurality of holes 62, which are so aligned that they may receive the threaded pins 5 projecting down from the ring 4 of the metal frame 1.

A gas producer 36 is received in the top part of the journal 54 so as to rest on the inside flange 55 of said journal. The edge 114 of the air bag 37 surrounds the gas producer 36 and is fastened between the gas producer 36 and the inner wall of the journal 54, the threaded pin 59 being used to fix the gas producer 36 in position in the journal 54. Here too, a transport cover 38, which extends across the exposed top opening defined by the upright outer wall 60, is provided for fixing the air bag 37 in position.

The air-bag anti-impact device 25 in the construction described in FIG. 4 is placed in position on the steering column 15, the steering column 15 having a lateral radial recess 64 for receiving the threaded pin 57. Consequently, the housing 51 with its journal 54 is placed onto the steering column 15 and the threaded pin 57 is tightened in order to lock the air-bag anti-impact device 25 firmly in position on the steering column 15. The frame 1 of the steering wheel may then be moved into position, its threaded pins 5 penetrating the holes 62 of the flange 61 of the housing 51, after which a screw nut 40 is placed onto each threaded pin 5 and tightened in order to fix the steering wheel in position on the housing 51.

When tripping causes the air bag to be inflated, in each of the above-described embodiments the cap 9 of the moulded part 6 bursts open along the predetermined breaking point defined by the notch 11, with the result that the cap 9 forms two portions which open relative to one another when the air bag 37 is fully inflated.

The present invention is, of course, in no way restricted to the specific disclosure of the specification and drawings, but also encompasses any modifications within the scope of the appended claims.

What we claim is:

1. A steering wheel unit for mounting on a steering column of a motor vehicle, said steering wheel unit comprising:

a steering wheel including an inner frame with a steering wheel rim and with at least one spoke connected to said steering wheel rim and extending radially inwardly toward a steering column and including a molded plastic envelope enclosing said inner frame;

an air-bag anti-impact device mounted on said steering wheel;

a cap for covering said air-bag anti-impact device;

said air-bag anti-impact device comprising a folded air-bag and a gas producer for inflating said air-bag when tripped;

said air-bag having a delimiting edge and being connected with said delimiting edge to said steering wheel to thereby delimit a gas inlet opening for gas produced by said gas producer upon tripping;

said cap being opened by the force of said air-bag when being inflated by said gas producer;

said molded plastic envelope and said cap being integrally formed so as to define a receiving area for said air-bag anti-impact device, wherein said air-bag anti-impact device is mounted within said receiving area;

wherein said steering wheel is comprised of a top part and a bottom part and wherein said top part and said bottom part together form said receiving area, wherein said air-bag is directly mounted in said top part, and said gas producer is positioned in said bottom part;

wherein said delimiting edge of said air-bag is fastened to said top part and subsequently said air-bag is placed into said top part.

2. A steering wheel unit according to claim 1, wherein said delimiting edge is clamped between said top part and said bottom part.

3. A steering wheel unit for mounting on a steering column of a motor vehicle, said steering wheel unit comprising:

a steering wheel including an inner frame with a steering wheel rim and with at least one spoke connected to said steering wheel rim and extending radially inwardly toward a steering column and including a molded plastic envelope enclosing said inner frame;

an air-bag anti-impact device mounted on said steering wheel;

a cap for covering said air-bag anti-impact device;

said air-bag anti-impact device comprising a folded air-bag and a gas producer for inflating said air-bag when tripped;

said air-bag having a delimiting edge and being connected with said delimiting edge to said steering wheel to thereby delimit a gas inlet opening for gas produced by said gas producer upon tripping;

said cap being opened by the force of said air-bag when being inflated by said gas producer;

said molded plastic envelope and said cap being integrally formed so as to define a receiving area for said air-bag anti-impact device, wherein said air-bag anti-impact device is mounted within said receiving area;

wherein said steering wheel is comprised of a top part and a bottom part and wherein said top part and said bottom part together form said receiving area, wherein said air-bag is positioned in said top part and said bottom part, and said gas producer is positioned in said bottom part;

wherein said delimiting edge and said gas producer are fastened jointly to said bottom part, said steering wheel unit further comprising a cover comprising a cup with a circumferential flange, said cup enclosing said air-bag and extending upwardly into said top part, said circumferential flange of said cover clamped between said top part and said bottom part.

4. A steering wheel unit for mounting on a steering column of a motor vehicle, said steering wheel unit comprising:

a steering wheel including an inner frame with a steering wheel rim and with at least one spoke connected to said steering wheel rim and extending radially inwardly toward a steering column and including a molded plastic envelope enclosing said inner frame;

an air-bag anti-impact device mounted on said steering wheel;

a cap for covering said air-bag anti-impact device;

said air-bag anti-impact device comprising a folded air-bag and a gas producer for inflating said air-bag when tripped;

said air-bag having a delimiting edge and being connected with said delimiting edge to said steering wheel to thereby delimit a gas inlet opening for gas produced by said gas producer upon tripping;

said cap being opened by the force of said air-bag when being inflated by said gas producer;

said molded plastic envelope and said cap being integrally formed so as to define a receiving area for said air-bag anti-impact device, wherein said air-bag anti-impact device is mounted within said receiving area;

further comprising a housing, wherein said air-bag anti-impact device is mounted in said housing and wherein said housing with said air-bag anti-impact device is mounted in said receiving area;

wherein said housing is pot-shaped and upwardly open and has a radially projecting circumferential outer flange for fastening said housing to said steering wheel.

5. A steering wheel unit according to claim 4, further comprising a snap connector for securing said housing to said steering wheel.

6. A steering wheel unit according to claim 5, wherein said snap connector comprises cooperating snap elements connected to said housing and to said molded plastic envelope.

7. A steering wheel unit according to claim 4, wherein said housing comprises at least one screw connection penetrating said outer flange for attaching said housing to said steering wheel.

8. A steering wheel unit for mounting on a steering column of a motor vehicle, said steering wheel unit comprising:

a steering wheel including an inner frame with a steering wheel rim and with at least one spoke connected to said steering wheel rim and extending radially inwardly toward a steering column and including a molded plastic envelope enclosing said inner frame:

an air-bag anti-impact device mounted on said steering wheel:

a cap for covering said air-bag anti-impact device:

said air-bag anti-impact device comprising a folded air-bag and a gas producer for inflating said air-bag when tripped:

said air-bag having a delimiting edge and being connected with said delimiting edge to said steering wheel to thereby delimit a gas inlet opening for gas produced by said gas producer upon tripping:

said cap being opened by the force of said air-bag when being inflated by said gas producer:

said molded plastic envelope and said cap being integrally formed so as to define a receiving area for said air-bag anti-impact device, wherein said air-bag anti-impact device is mounted within said receiving area:

further comprising a housing, wherein said air-bag anti-impact device is mounted in said housing and wherein said housing with said air-bag anti-impact device is mounted in said receiving area;

further comprising fasteners for mounting said housing to said steering wheel and comprising a mounting frame for connecting said steering wheel unit to the steering column, wherein said fasteners are simultaneously used to attach said steering wheel to said mounting frame.

9. A steering wheel unit according to claim 8, wherein said air-bag anti-impact device comprises a tripping device for tripping said gas producer and an acceleration sensor connected to said tripping device and mounted on said mounting frame.

10. A steering wheel unit for mounting on a steering column of a motor vehicle, said steering wheel unit comprising:
 a steering wheel including an inner frame with a steering wheel rim and with at least one spoke connected to said steering wheel rim and extending radially inwardly toward a steering column and including a molded plastic envelope enclosing said inner frame;
 an air-bag anti-impact device mounted on said steering wheel;
 a cap for covering said air-bag anti-impact device;
 said air-bag anti-impact device comprising a folded air-bag and a gas producer for inflating said air-bag when tripped;
 said air-bag having a delimiting edge and being connected with said delimiting edge to said steering wheel to thereby delimit a gas inlet opening for gas produced by said gas producer upon tripping;
 said cap being opened by the force of said air-bag when being inflated by said gas producer;
 said molded plastic envelope and said cap being integrally formed so as to define a receiving area for said air-bag anti-impact device, wherein said air-bag anti-impact device is mounted within said receiving area;
 further comprising a housing, wherein said air-bag anti-impact device is mounted in said housing and said housing is connected between said steering wheel and the steering column;
 wherein said housing comprises a sleeve for mounting said housing to the steering column and further comprises radially engaging fasteners for attaching said sleeve to the steering column.

11. A steering wheel unit according to claim 10, wherein said housing is pot-shaped and upwardly open and has a radially projecting circumferential outer flange for fastening said housing to said steering wheel, wherein said inner frame comprises at least one screw connection far attaching said outer flange to said steering wheel.

12. A steering wheel unit including a steering wheel, said steering wheel comprising:
 an inner frame comprising a steering wheel rim and at least one spoke connected to said steering wheel rim and extending radially inwardly;
 a molded plastic envelope enclosing said inner frame;
 said molded plastic envelope comprising a center portion extending across a central part of said steering wheel, said center portion having a recess for receiving an air-bag unit;
 said steering wheel unit further comprising an air-bag unit having a radially outwardly extending flange with apertures, and further including fasteners, wherein said fasteners pass through said apertures to secure said air-bag unit with said flange to said inner frame.

13. A steering wheel unit according to claim 12, wherein said fasteners comprise studs supported by said inner frame and nuts engaging said studs.

14. A steering wheel unit according to claim 12, further comprising a mounting frame for attaching to a steering column of a vehicle, wherein said fasteners connect said steering wheel together with said air-bag unit to said mounting frame.

15. A steering wheel unit according to claim 14, wherein said steering wheel and said air-bag unit form a preassembled unit fastened to said mounting frame.

16. A steering wheel unit including a steering wheel, said steering wheel comprising:
 an inner frame comprising a steering wheel rim and at least one spoke connected to said steering wheel rim and extending radially inwardly;
 a molded plastic envelope enclosing said inner frame;
 said molded plastic envelope comprising a center portion extending across a central part of said steering wheel, said center portion having a recess for receiving an air-bag unit;
 further comprising an air-bag unit, wherein said air-bag unit comprises a housing with a substantially cylindrical wall and wherein said inner frame comprises a ring, wherein said cylindrical wall of said housing abuts said ring, further comprising at least one fastener for connecting said cylindrical wall to said ring;
 further comprising a mounting frame connected to a steering column of a vehicle, wherein said at least one fastener connects said steering wheel together with said air-bag unit to said mounting frame.

17. A steering wheel unit according to claim 16, wherein said ring has at least one aperture and said cylindrical wall has at least one aperture, said at least one aperture of said ring being aligned with said at least one aperture of said cylindrical wall and said at least one fastener extending through said aligned apertures.

18. A steering wheel unit according to claim 16, further comprising a crash sensor, for triggering said air-bag unit, directly mounted on said mounting frame, wherein said mounting frame is substantially rigidly connected to the steering column.

19. A steering wheel unit according to claim 16, wherein said steering wheel and said air-bag unit form a preassembled unit fastened to said mounting frame.

* * * * *